United States Patent
Washecka

[19]

[11] Patent Number: 6,006,466
[45] Date of Patent: Dec. 28, 1999

[54] CONCEALED LINEAR PAYOUT HOLDER FOR FISHING LEADER

[76] Inventor: John Washecka, 8915 Fairway Hill, Austin, Tex. 78750

[21] Appl. No.: 09/136,941

[22] Filed: Aug. 20, 1998

[51] Int. Cl.⁶ .................................................. A01K 91/00
[52] U.S. Cl. .................................................. 43/43.11; 43/1
[58] Field of Search ...................... 43/43.11, 43.1, 43/43.15, 42.36, 42.35, 42.04, 42.05, 34, 35, 37; 242/378.3, 378.2, 378.1, 372

[56] References Cited

U.S. PATENT DOCUMENTS

| | | | |
|---|---|---|---|
| 384,853 | 6/1888 | Keller | 43/43.11 |
| 446,535 | 2/1891 | Outerbridge | 43/43.11 |
| 541,789 | 6/1895 | Kunzelman | 43/43.11 |
| 584,615 | 6/1897 | Wilson | 43/43.11 |
| 676,962 | 6/1901 | Payton | 43/43.11 |
| 832,881 | 10/1906 | Skinner | 43/43.11 |
| 1,707,820 | 4/1929 | Stackelberg | 43/43.11 |
| 1,915,208 | 6/1933 | Walthers | 43/43.11 |
| 2,014,517 | 9/1935 | Beregow | 43/43.11 |
| 2,498,815 | 2/1950 | McVay | 43/43.11 |
| 2,734,303 | 2/1956 | Peck et al. | 43/43.11 |
| 2,778,146 | 1/1957 | Peck | 43/43.11 |
| 2,799,114 | 7/1957 | Turner | 43/43.11 |
| 2,860,442 | 11/1958 | Turner | 43/43.11 |
| 3,230,659 | 1/1966 | Colling | 43/43.11 |
| 3,341,965 | 9/1967 | Purcella | 43/43.11 |
| 3,364,613 | 1/1968 | Sewell | 43/43.11 |
| 3,425,151 | 2/1969 | Salfer | 43/43.11 |
| 3,611,613 | 10/1971 | Perches | 43/43.11 |
| 3,673,729 | 7/1972 | Lintz | 43/43.11 |
| 3,703,783 | 11/1972 | Pool | 43/43.11 |
| 4,251,941 | 2/1981 | Howard | 43/43.11 |
| 4,534,127 | 8/1985 | Thorvaldsen | 43/43.11 |
| 4,630,390 | 12/1986 | Burkeen et al. | 43/43.11 |
| 5,131,183 | 7/1992 | Thayer et al. | 43/43.11 |
| 5,235,776 | 8/1993 | Backus | 43/43.11 |

FOREIGN PATENT DOCUMENTS

| | | | |
|---|---|---|---|
| 715266 | 8/1965 | Canada | 43/43.11 |
| 1420508 | 11/1965 | France | 43/43.11 |

*Primary Examiner*—Michael J. Carone
*Assistant Examiner*—Fredrick T. French, III

[57] ABSTRACT

This invention relates generally to fishing tackle or equipment and more specifically to a device to conceal or camouflage a fishing leader during presentation of the bait and disburse that leader after the hookup. The housing for the payout leader system of this invention is composed of two half shells, one male and one female, fitting together, that contain a hollow space between them. A portion of leader is temporarily stored in this space. The first end of the leader exits the device's front aperture and is attached to the fishing line. The second end of the leader exits the device's rear aperture and is attached to a hook. The force from the fish striking the hook causes the leader material to exit the device. The first and preferred embodiment (for fishing with bait) is for the leader to payout exclusively through the front aperture. A second embodiment (for fishing with lures and feathers) would be for the leader to be paid out through the rear aperture. This device is designed to allow a third alternative one which would have the leader paid out simultaneously through both the front and rear apertures. While this device will work with all hooks it is particularly useful with the circle hook.

4 Claims, 4 Drawing Sheets

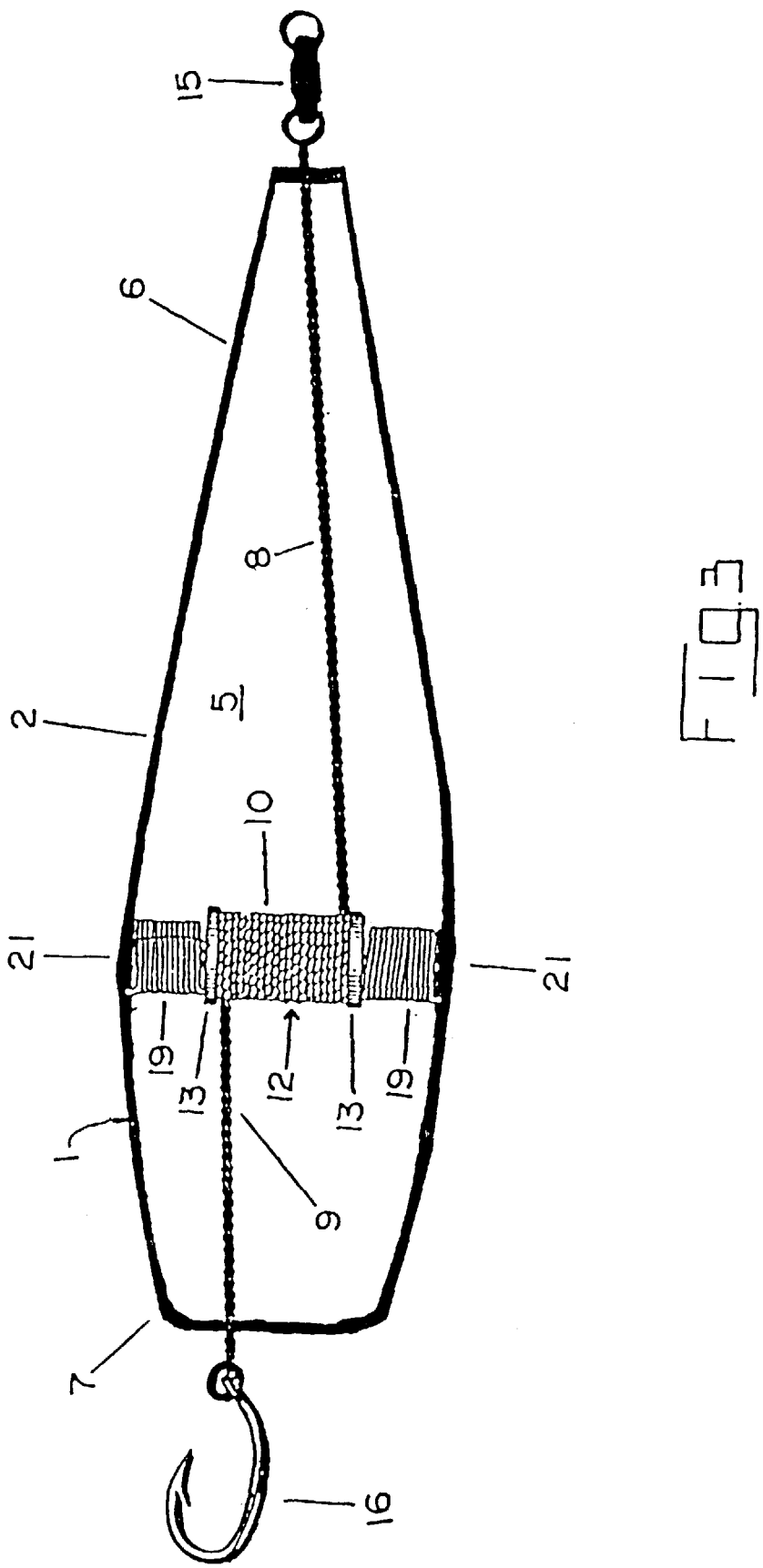

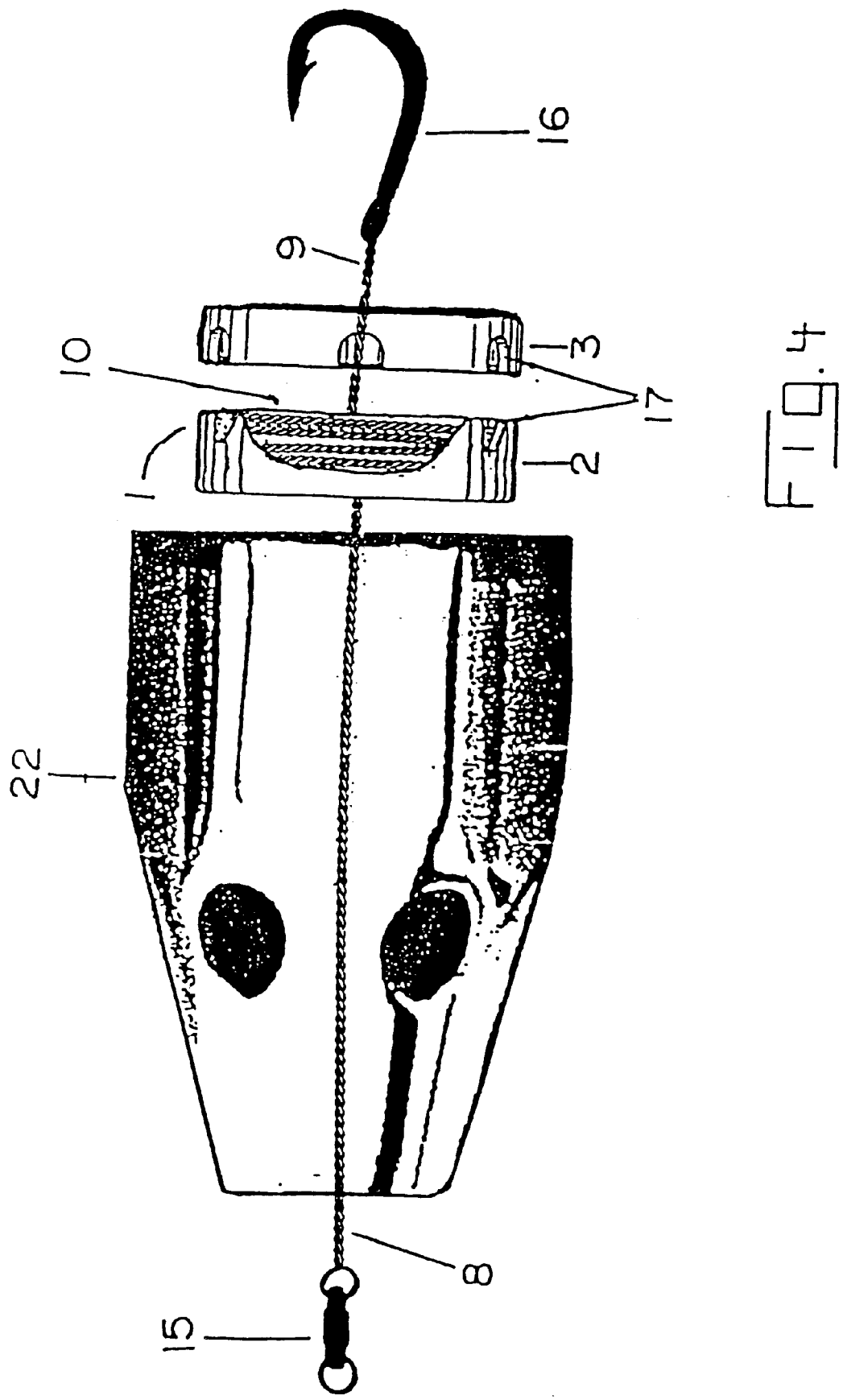

CONCEALED LINEAR PAYOUT HOLDER FOR FISHING LEADER

BACKGROUND OF INVENTION

Improved fishing gear is the quest of most fishermen and is the subject of many patents. There are two basic components to fishing. The first element is to entice a fish to strike at a bait and be hooked. The second element is to be able to control that fish until he is ready for capture or release.

Many fishermen have learned, the hard way, that the portion of the line nearest the hook is subject to extra abrasion and wear and tear that occurs during the contest. Thus fishermen have added a short portion of strengthened material between the hook and the fishing line called a leader. Leaders are made from a material sufficiently robust to withstand the cutting or breaking by the jaws, teeth, or bill of the fish. In some cases the leader is made from a strengthened line such as monofilament and in other cases the leader is made from a wire product.

Wire products are more visible. Certain fish see this wire and avoid striking hooks attached to wire leaders. These fish are leader sensitive. For example tuna fish are highly suspicious of wire leaders and experience teaches that tuna fish avoid striking wire leaders altogether. For tuna fishermen the leader of choice will be made of a strengthened monofilament line. Even with the additional strength leaders the tuna fish's jaw can break or cut the monofilament leaders.

There are other fish such as king fish and sharks who's earned reputation is that their teeth can cut even the strongest lines. To catch these toothy fish a wire leader must be used. Thus the fisherman must make a decision between hooking more fish with an "invisible" monofilament leader and losing most, if not all, the toothy fish or hooking less fish with the more visible wire leaders.

The problem is that both the tuna and toothy fish may be in the same area, at the same time and each may strike the same bait. To "play-the-odds" the fisherman solves this problem by using monofilament leaders on a portion of their equipment and wire leaders on the balance of the gear. These fisherman hope that the right fish strikes the right leader.

Despite the longstanding problems encountered by using leaders, this operation is still carried out substantially in the same manner as was employed decades ago. The present invention solves a long-felt but unsolved need providing a simple but effective system for using a strengthened leader without the problems of the prior art.

Nothing in the prior art has disclosed a device to conceal or disguise a leader within a bait or lure. Moreover, nothing in the prior art has suggested an integrated system utilizing a mechanism for storage and concealment of fishing leaders within the bait or lure.

BRIEF SUMMARY OF THE INVENTION

The present invention is designed to conceal a strengthened leader during the presentation of the bait and then dispense that leader during the actual contest between the fisherman and the fish. In the preferred embodiment, the invention comprises an elongated tubular member with a body cavity of sufficient size to hold a quantity of coiled leader material. Since the strengthened leader is not visible until after the hook has been engaged, more fish will strike at the bait and be hooked. While all fish hooks can be used with this device the most effective hook for this device is the circle hook. Thus the present invention solves a previously unrecognized problem.

The basic design of the device is compact, slender and has a smooth housing that can be conveniently carried in a tackle fish-box, placed within a bait fish or lure, or even attached to the side of a live bait in the presentation of that bait. In the pre-strike stage, the body cavity of this device protects the leader and prevents the leader from catching on obstructions, being twisted, or being kinked.

In the most basic design of the first configuration, the leader holding device consists of a leader dispensing system and four major elements: (1) a female half shell, (2) a male half shell, (3) a strengthened leader and (4) retaining cap.

The first embodiment of the device requires the first end of the leader to be threaded through the front aperture, through a retaining cap, and then be attached to a snap swivel which would be attached to the fishing line. After the device is attached to the fishing line the operator manually inserted the retaining cap into the front aperture with sufficient force to frictionally hold the retaining cap and the leader in place. Thus in the initial pre-strike stage the leader is releasable held in the aperture by this retaining cap. The striking fish dislocates the retaining cap and the leader is paid out.

The preferred embodiment a machine wrapped wire leader coil would be placed within the body cavity of the device. The leader coil would be configured as a helix having a constant diameter and a uniform pitch or winding frequency. The diameter of the coil would be sized to fit within the body cavity. The length of the spiraled wire coil would be determined by the length of the leader material desired to be concealed.

It is an objective of this invention to allow a fisherman to recoil the leader material with little or no tools and then replace the coiled leader in the device's body cavity. In the current example the fisherman could rewrap the leader clockwise around a pencil or similar sized rod. The pencil with the wrapped wire would be inserted into the body cavity. The pencil would be rotated counter-clockwise until the leader is released from the pencil. The pencil would then be removed from the device. In using the device for a second time the fisherman could also chose to place a new machine wrapped leader coil within the device's body cavity.

Several enhancements may be incorporated into the concealed linear payout holder described above to increase the utility of this invention. For example in a second embodiment of this device there would be a means for both storing and retracting the leader on a reel within the body cavity. One embodiment incorporates a reel or drum for holding a coil of leader and a spring allowing for retraction of the leader when the force exerted against the spring is less then the torque of the spring. In this embodiment the monofilament fishing line enters the front aperture and is attached to the reel. The first end of the leader is attached to a spring and rolled around the reel. The second end of the leader is passed through the rear aperture and attached to a hook. The force from the striking fish causes a pulling on the leader thereby causing the reel to unwind dispensing the leader from the reel and the device. When the tension from fighting the fish is concluded, a coiled spring associated with the reel causes the leader to rewind.

It is envisioned that the reels would be spring loaded and return the leader to its original position. However it is also envisioned that the reels could be manually operated and that the fisherman would prefer that the leader remain extended. In this embodiment a pin or the like would be inserted in a full reel preventing the reel from operation and payout. The pin would be designed to break at a certain force thereby releasing the reel to payout the leader. The fisherman could reuse this devise by rewinding the leader on the reel and inserting a new pin.

It is anticipated that there could be several other embodiments of this device. One such example could be a combination of the frictionally held leader in the front of the device and spring held leader in the rear of the device.

It is also envisioned that the device would be used for live bait as well as dead bait. In this embodiment a clip member or the like is attached to the side surface of the device for enabling attachment of an elastic means to be attached to a live bait fish. One such enhancement would be an elastic restraining band which would go around the live bait thereby attaching said bait to the device. As the live bait moves through the water, the hydrodynamically drag of the water along the exterior surface of the device is equal to the line tension of the fishing line attached to snap swivel at the terminal end of the fishing line.

In yet another embodiment of this invention the device is designed to work with artificial lures. In this embodiment, the device would be incorporated into the design of the lure and the device's housing would be cast into the lure as part of the molding process. Thus the lure itself would act as the housing for storage and payout of this invention.

In yet another example the device would be placed within a lure or trolling feather, and as with the dead bait, the device would have a variety of means of both payout and rewind. In one such embodiment, the leader would be wound around and stored in a bobbin like reel. The body or cylinder of the bobbin would be attached to head of a trolling lure in some conventional means such as threaded or glued. The leader would be wound around a real or imaginary spindle or shaft and stored in the body of the bobbin. The first end of the leader would be passed through a fictionally or spring loaded cap and then attached to a hook. The second end of the leader would be passed through an aperture in the base of the bobbin, threaded through the head of the trolling lure and attached to a swivel. The force of the fish's strike detaches the cap and pays out the leader.

It is yet a further objective of this device to store and carry leaders in an orderly manner without the leaders getting tangled, crimped, or kinked. Thus the fishing leader holder of this invention allows the fisherman to carry a number of leaders in a fishing tackle box. This provides the user with an orderly means of arranging and carrying a plurality of fishing leaders in different lengths and strengths in a secure untangled manner.

It is accordingly an objective of the present invention to provide a device for allowing the fisherman to change leaders quickly, frequently, and without special tools.

It is a further an objective of the present invention to provide a device of the aforesaid nature of simple, rugged design, amenable to low cost manufacture.

Accordingly, it would be an advantage for fishermen to have a linear payout system that allows a strengthened leader to be coiled inside a leader housing and would disguise the strengthened leader and at the proper time deploy that leader material in a smooth nonabrasive mechanism producing a strengthened portion of the leader between the bait and the fishing line. Thus it is an objective of this invention to be operative in a first mode for holding a leader in restraint, threat, and operative in a second mode for releasing such leader material therefrom.

Further objects and advantages of this invention will become apparent from a consideration of drawings and ensuing description

BRIEF DESCRIPTION OF THE SEVERAL VIEWS OF THE DRAWING

FIG. 3 is a perspective view of a bobbin shaped housing of the linear payout holder of this invention.

FIG. 4 is a side elevational sectional view, partially broken away of the holder of FIG. 3, illustrating another embodiment of the invention with trolling lure

Figure 1:
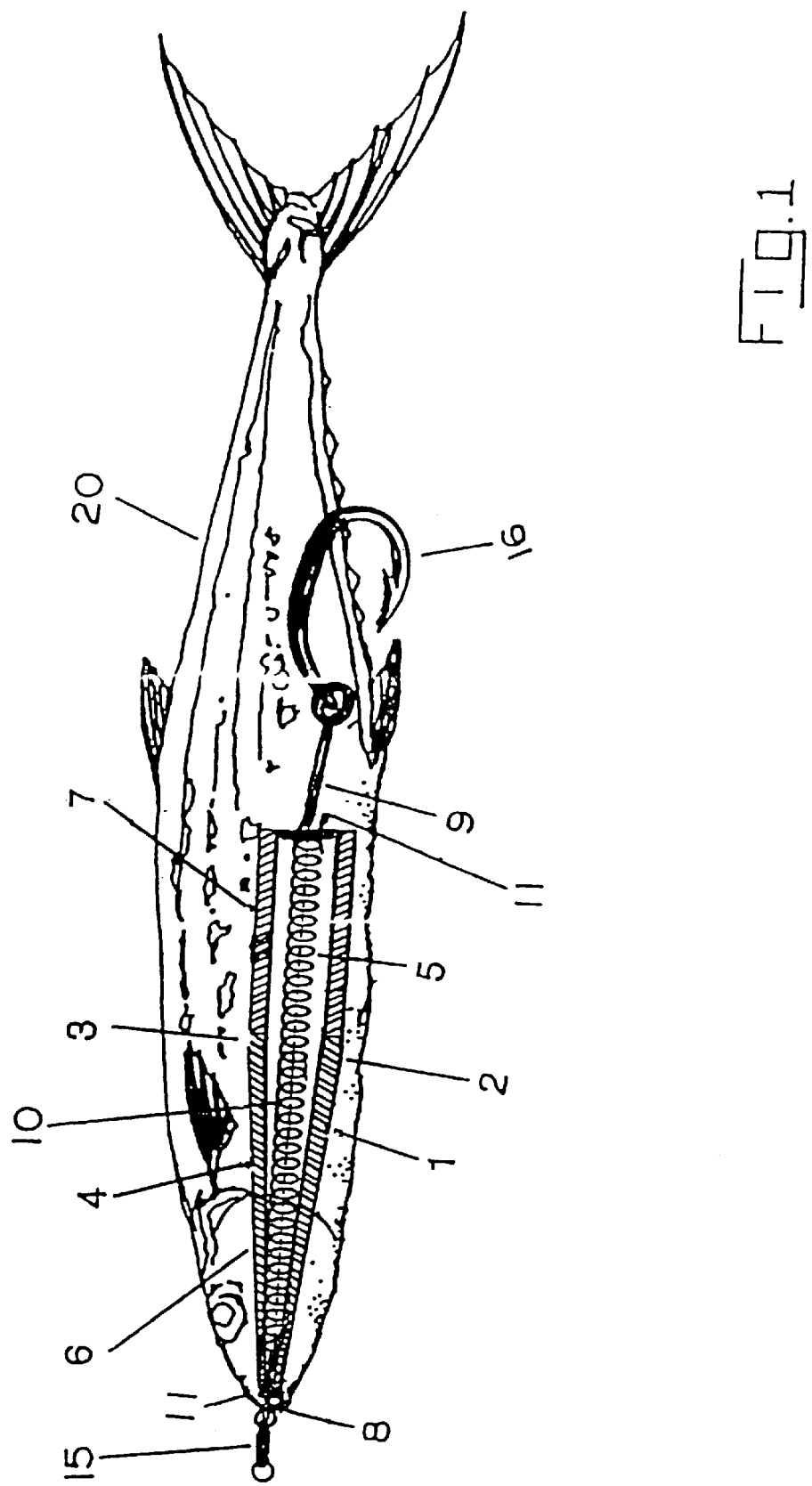
FIG. 1 is a fragmentary side elevational view depicting the preferred embodiment of a fishing payout leader holder inserted into a bait and attached to a fishing line and hook.

DETAILED DESCRIPTION OF THE INVENTION 1. device
2. female portion of the elongated tubular body
3. male portion of the elongated tubular body
4. housing
5. body cavity
6. forward section
7. rearend section
8. First end of the leader
9. Second end of the leader
10. leader coil
11. retaining stopper
12. reel
13. rim
14. reel pins
15. swivel
16. Hook
17. flanges
19. stainless steel spring
20. bait
21. shaft
22. head of trolling lure Shown in FIG. 1, is a fragmentary side elevational view depicting a fishing payout leader holder 1 of this invention inserted into a bait 20 and attached to a fishing line and hook 16. This cross section of an embodiment of this invention illustrates the internal construction and mechanism of the fishing payout leader holder or device 1 for holding fishing leaders of various diameters and of lengths.

The device 1 has a forward end and a rearward end, these being designated in the drawings with reference to numbers 6 and 7 respectively. The forward section 6 of the device 1 may be shaped with a strengthened conical, tapered nose that in one version, as shown in FIG. 1, is inserted into a bait. The device's 1 housing 4 is preferably molded in two snap together pieces or two half shells, one female 2 and one male 3, fitting together to form a compact assembly: the housing 4. Each of the half-shells 2 and 3 has a cylindrical inside volume which forms the body cavity 5 of the housing 4 and where the leader coil 10 will be stored.

The device 1 is provided with a co-axial extension (not shown) formed by an internal smaller diameter tube which extends co-axially through the forward section 6. The first end of the leader 8 is threaded through a co-axial extension in the forward section 6 of the device 1, through a retaining stopper 11 and thence attached to an swivel 15. In the illustrated form of this invention, the slidable retaining stoppers 11 are composed of rubber gaskets shaped to frictionally close the opening and hold the leader until a force is exerted, by the striking fish. The strike disengages the frictionally held retaining stopper 11 thereby disbursing the leader coil 10.

The second end of the leader 9 extends rearwardly through rear end section 7 and is available to be attached to a hook 16. Between the first end of the leader 8 and the second end of the leader 9 is a defined length of coiled leader 10 nested within the body cavity 5 of the device 1.

In the first preferred embodiment of this invention, as illustrated in FIG. 1, the leader coil 10 is wrapped with the leader material being overlapped side-by-side circumferencially around a longitudinal axis of the cylindrical cavity. The leader would be wound on a package spool providing for maximum degree of mechanical integrity with an economic potential for achieving high rates of production at low costs. Extra package spools of machine wrapped leader could be inserted into the body cavity 5 as needed or the fisherman could rewind the original coil 10 and insert it in the body cavity 5.

Figure 2:
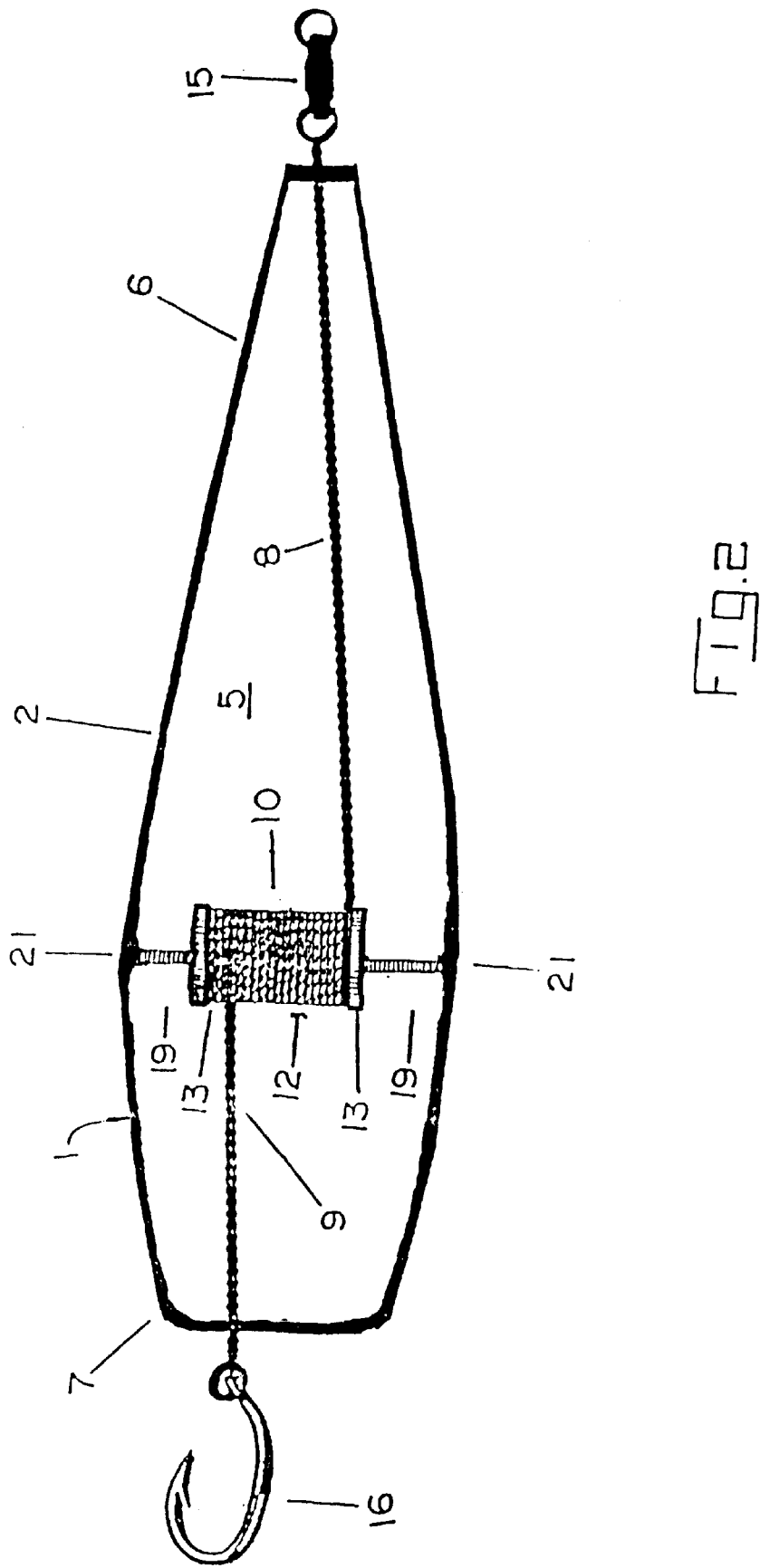
FIG. 2 is a fragmentary top elevational view without the top or male portion of the housing depicting the another embodiment of a fishing payout leader holder using a reel and spring retraction system attached thereto.

FIG. 2 illustrates another embodiment in which a reel 12 means is mounted on a shaft 21 within the body cavity 5. The first end of the leader 8 is connected at one end to the reel 12, in any suitable manner, and wound thereon, thus storing the leader coil on the reel 12. The second end of the leader 9 is attached to a hook 16. Thus as a fish runs with the hook 16 the leader is unwound from the reel 12.

FIG. 2 also illustrates a shaft 21 having its opposite ends fixedly mounted in the female portion 2 of the housing 4, a reel or drum 12 rotatable mounted on the shaft 21, and coil springs 19 mounted around the shaft 21 at opposite ends of the reel 12. The reel 12 has a pair of raised rims 13 at opposite ends thereof Opposite ends of the coil springs 19 are connected to or embedded, respectively, in a side walls of the female portion 2 of the housing 4 and an adjacent rim 13. In this manner, the reel 12 is spring-biased into an initial rotational position.

The device is designed so that pulling on the hook 16 or the second end of the leader 9 causes the reel 12 to turn, unwinding and paying-out the leader 10 from the reel 12. Thus a striking fish exerts more force than the spring's 19 bias permitting an extension of the leader against the force of the coil spring 19. Thereby allowing the benefits of the strengthened leader during the hook-up.

When the frictional pressure from the fish is removed the coil springs 19 rotate the reel 12, rewinding the leader 10 back to the original position on the reel 12. Thus such retraction mechanisms permits both the extension of the leader 10 and the retraction of the leader 10.

In yet another embodiment, not shown, there would be no springs and the reel 12 would be manually rewound by the fishermen.

FIG. 3 and FIG. 4 shows an embodiment of this device that may be used with trolling lures. The housing 4 of this embodiment is shaped like a bobbin and may be attached to the head of a trolling lure 22 in some conventional means such as threaded or glued. The leader coil 10 would be stored in the body cavity 5 of the bobbin like housing 4 and wound around a reel or spindle or shaft. The first end of the leader 8 would be passed through the first aperture and then attached to a hook 16. The first end of the leader 8 may be fictionally held with a retaining stopper 11 or the male portion 3 of the housing 4 may be spring loaded and separate from the female portion 2 of the housing from the force of the fish strike. In either case the strike of the fish will payout the leader coil 10. The second end of the leader 9 would be passed through hole in the base of the female portion 2 of the bobbin like housing 4, threaded through the head of the trolling lure 22 and attached to a swivel 15. When a fish strikes the hook 16 the force of the strike detaches the cap 3 and pays out the leader 10.

Thus with a version of this device a fisherman can choose to have the leader payout from the front of the device 1 or the back of the device 1 or both the front and back simultaneously. The fisherman can further chose to have a manual control on the rewinding of the leader or can choose to have the leader rewound automatically.

Thus the reader will see that the liner payout system of this invention provides a highly reliable, lightweight, yet economical device that can be used by all fisherman.

While the above descriptions contain many specificities, these should not be construed as limitation on the scope of the invention, but rather as an exemplification of one preferred embodiment thereof. For example as shown in FIG. 1 and FIG. 2 the device 1 is designed to be hydrodynamically shaped to facilitate its passage through the water with minimum drag effect. A plurality of flanges 17 are mounted on the outside body of the device 1 allowing the device 1 to be attached to live bait and is meant to be attached to the bait without harming said bait.

Accordingly, the scope of the invention should be determined not by the embodiments illustrated, but by the appended claims and their legal equivalents.

What is claimed is:

1. A fishing leader holder assembly comprising;
  a housing,
    said housing comprising;
    a forward section being a hollow generally cylindrical shell having a rounded tapered first forward section end,
    said first forward section end having a first forward section aperture,
    and a second forward section end being a female portion,
    a rear section being a hollow generally cylindrical shell having a first rear section end,
  said first rear section end having a first rear section aperture,
  and a second rear section end being a male portion,
  wherein the female portion of the second forward section end connectably engages the male portion of the second rear section end defining a hollow interior of said housing being defined between said first forward section aperture and said first rear section aperture; and
  a leader of a predetermined length, said predetermined length being substantially longer than a length defined by the hollow interior of said housing,
  the leader being coiled and stored within the hollow interior of said housing,
  said leader having a first leader end and a second leader end,
  said first leader end extending externally through said first forward section aperture of said housing and being attached to a swivel and a fishing line,
  said second leader end extending externally through said first rear section aperture and being attached to a fishing hook; and
  and retention means being attached to the first and second leader ends,
  said retention means being releasably engageable with said first forward section aperture and said first rear second aperture to retain said leader within said housing, wherein the leader is concealed and protected within the hollow interior of said housing until a fish strikes the hook, wherein the retention means are disengaged from said first forward section aperture and said first rear section aperture and the leader is disbursed from within the hollow interior of the housing.

2. The fishing leader holder assembly according to claim 1, wherein the housing is capable of being inserted into or fastened onto a live bait fish.

3. The fishing leader holder assembly according to claim 1, wherein the housing is capable of being inserted into or fastened onto a fishing lure.

4. The fishing leader holder assembly according to claim 1, wherein the housing is a fishing lure.

\* \* \* \* \*